US012187335B2

(12) United States Patent
Jian

(10) Patent No.: US 12,187,335 B2
(45) Date of Patent: Jan. 7, 2025

(54) FLATBED TRUCK WITH A FOLDABLE CASTER UNIT

(71) Applicant: GUANGDONG SHUNHE INDUSTRIAL CO., LTD., Guangdong (CN)

(72) Inventor: Shikun Jian, Guangdong (CN)

(73) Assignee: GUANGDONG SHUNHE INDUSTRIAL CO., LTD., Guangdong (CN)

( * ) Notice: Subject to any disclaimer, the term of this patent is extended or adjusted under 35 U.S.C. 154(b) by 288 days.

(21) Appl. No.: 17/800,216

(22) PCT Filed: Sep. 3, 2020

(86) PCT No.: PCT/CN2020/113210
§ 371 (c)(1),
(2) Date: Aug. 16, 2022

(87) PCT Pub. No.: WO2021/189773
PCT Pub. Date: Sep. 30, 2021

(65) Prior Publication Data
US 2023/0066055 A1    Mar. 2, 2023

(30) Foreign Application Priority Data
Mar. 24, 2020  (CN) .......................... 202010212913.5

(51) Int. Cl.
*B62B 3/02* (2006.01)
*B60B 33/06* (2006.01)

(52) U.S. Cl.
CPC ................ *B62B 3/02* (2013.01); *B60B 33/06* (2013.01); *B62B 2301/05* (2013.01)

(58) Field of Classification Search
CPC ....... B62B 3/02; B62B 2301/05; B62B 3/022; B62B 3/025; B60B 33/06
See application file for complete search history.

(56) References Cited

U.S. PATENT DOCUMENTS

| 7,784,816 | B2 * | 8/2010 | Jian |
| 10,118,633 | B2 * | 11/2018 | Gibson |
| 2010/0140889 | A1 | 6/2010 | Chang |

FOREIGN PATENT DOCUMENTS

| CN | 2673754 | 1/2005 |
| CN | 101278875 | 10/2008 |

(Continued)

OTHER PUBLICATIONS

"International Search Report (Form PCT/ISA/210) of PCT/CN2020/113210", mailed on Dec. 25, 2020, with English translation thereof, pp. 1-4.

*Primary Examiner* — James A Shriver, II
*Assistant Examiner* — Nicholas R. Kandas
(74) *Attorney, Agent, or Firm* — JCIPRNET

(57) ABSTRACT

A flatbed truck with a foldable caster unit, comprising a load-bearing plate, a load-bearing support frame and a caster unit, and further comprising a caster unit rotation driving device. The caster unit rotation driving device comprises an operating handle, a connecting rod, a front linkage mechanism and a rear linkage mechanism, wherein the operating handle is pivotally connected with the load-bearing plate and is rotatable around a pivot axis of the operating handle. The operating handle is capable of linking with the front linkage mechanism and the rear linkage mechanism via the connecting rod to respectively drive the front caster unit and the rear caster unit to be rotated from the folded storage position to the unfolded rolling position, when the operating handle is rotated from a first position to a second position.

12 Claims, 18 Drawing Sheets

(56) References Cited

FOREIGN PATENT DOCUMENTS

| | | |
|---|---|---|
| CN | 201432709 | 3/2010 |
| CN | 205256374 | 5/2016 |
| CN | 111137344 | 5/2020 |
| JP | 2005170264 | 6/2005 |

* cited by examiner

FLATBED TRUCK WITH A FOLDABLE CASTER UNIT

CROSS-REFERENCE TO RELATED APPLICATION

This application is a 371 of international application of PCT application serial no. PCT/CN2020/113210, filed on Sep. 3, 2020, which claims the priority benefit of China application no. 202010212913.5, filed on Mar. 24, 2020. The entirety of each of the above mentioned patent applications is hereby incorporated by reference herein and made a part of this specification.

TECHNICAL FIELD

The present invention belongs to the technical field of small plane transportation equipment, and more particularly, relates to a flatbed truck with a foldable caster unit.

BACKGROUND

Flatbed truck is a commonly used transportation tool at present, which is mostly used for the transportation of goods between shelves and warehouses in shopping malls and supermarkets, as well as for consumer shopping storage and transportation. Different scenarios require different flatbed trucks. The existing flatbed trucks do not have functions that can cope with various scenarios, and most of the caster units cannot be folded and received, which takes up a lot of space, is not conducive to storage, and increases the cost during transportation.

At present, on the market, there are flatbed trucks with push handles and with caster units which can be folded and received. The opening or receiving of the push handles is linked and synchronized with the opening or receiving of the caster units. For this kind of flatbed trucks, the push handle is opened relative to the load-bearing plate to a vertical position of 90 degrees, the caster unit is just opened to the fully opened state. Therefore, in order to ensure synchronization with the caster unit, the push handle of this kind of flatbed truck cannot be opened at an angle of more than 90 degrees relative to the load-bearing plate, and cannot be used as a flatbed truck. The working mode is limited.

SUMMARY

The purpose of the present invention is to solve at least one of the above-mentioned technical problems, and to provide a flatbed truck with a foldable caster unit that can be folded and stored or unfolded and rolled, which is simple and quick in operation, stable in performance, and can cope with various scenarios.

The present invention is achieved by the following technical solution.

A flatbed truck with a foldable caster unit, comprising a load-bearing plate, a load-bearing support frame and a caster unit, the load-bearing support frame being arranged at a bottom of the load-bearing plate, and the caster unit being mounted on the load-bearing support frame and is rotatable around a pivot axis of a corresponding caster unit between a folded storage position and an unfolded rolling position, the caster unit comprising a front caster unit and a rear caster unit, wherein, the flatbed truck with the foldable caster unit further comprises a caster unit rotation driving device, and the caster unit rotation driving device comprises an operating handle, a connecting rod, a front linkage mechanism and a rear linkage mechanism, wherein the operating handle is pivotally connected with the load-bearing plate and is rotatable around a pivot axis of the operating handle, the connecting rod is linked with the operating handle, and the front linkage mechanism is linked with the connecting rod and the front caster unit, the rear linkage mechanism is linked with the connecting rod and the rear caster unit, the operating handle is capable of linking with the front linkage mechanism and the rear linkage mechanism via the connecting rod to respectively drive the front caster unit and the rear caster unit to be rotated from the folded storage position to the unfolded rolling position, when the operating handle is rotated from a first position to a second position; the front caster unit and rear caster unit both are provided with a reset device, and the front caster unit and the rear caster unit are capable of being rotated from the unfolded rolling position to the folded storage position under an action of the reset device, when the operating handle is rotated from the second position to the first position.

In the above technical solution, when it is necessary to use a flatbed truck with a foldable caster unit to transport goods, the user only needs to hold down the load-bearing plate with one hand and to rotate the operating handle from the first position to the second position with the other hand, then the front linkage mechanism and the rear linkage mechanism drive the caster unit to unfold from the folded storage position to the unfolded rolling position, such that the flatbed truck with the foldable caster unit is switched to a working state. The operation is simple, convenient and fast. When it is necessary to carry or store the flatbed truck with the foldable caster unit, the user only needs to hold down the load-bearing plate with one hand, and rotate the operating handle from the second position to the first position with the other hand to link the front linkage mechanism with the rear linkage mechanism to cancel the effect on the caster unit. Under the action of the reset device, the caster unit is rotated from the unfolded rolling position to the folded storage position, such that the flatbed truck with the foldable caster unit is switched to a non-working state, which reduces the occupied space and facilitates portability and storage.

Preferably, a push handle is provided on an upper surface of the load-bearing plate. The push handle comprises two vertical rods, and bottom ends of the two vertical rods are both pivotally connected with fixing bases. The fixing bases are sleeved on the load-bearing support frame and are fixed at a position behind the rear caster unit. The push handle is capable of being rotated around a pivot axis of the push handle, and the two fixing bases are connected with a reinforcing rod. The reinforcing rod is provided with a locking mechanism capable of locking the push handle from rotating. In this way, by arranging the push handle, and the push handle can be rotated relative to the load-bearing plate without affecting the rotation of the caster unit, then the present invention can have three working modes, which are specifically as follows: a platform mode in which the push handle is attached to the upper surface of the load-bearing plate, and a platform pushing mode in which the push handle is relatively vertical to the load-bearing plate at 90 degrees, and a platform dragging mode in which the push handle is rotated more than 90 degrees and less than 180 degrees relative to the load-bearing plate, which are more flexible to use.

Preferably, the front linkage mechanism comprises a front driving pipe, a front supporting arm and a front fixing base, and the front driving pipe is rotatably connected with the connecting rod. One end of the front supporting arm is connected and fixed with the front driving pipe, and another end of the front supporting arm is pivotally connected with the front fixing base. The front fixing base is connected and fixed with the load-bearing plate, and the front driving pipe is arranged such that the end of the front driving pipe is capable of abutting against an inner surface of the front caster unit so as to drive the front caster unit to rotate and unfold to the unfolded rolling position during an rotation of the operating handle from the first position to the second position. In this way, when the operating handle is rotated from the first position to the second position, the operating handle will link the connecting rod to change the position of the front driving pipe, such that the end of the front driving pipe abuts against the inner side of the front caster unit, forcing the front caster unit to rotate and unfold to the unfolded rolling position.

Preferably, the rear linkage mechanism comprises a rear driving pipe, a rear supporting arm and a rear fixing base, and the rear driving pipe is rotatably connected with the connecting rod. One end of the rear supporting arm is connected and fixed with the rear driving pipe, and another end of the rear supporting arm is pivotally connected with the rear fixing base. The rear fixing base is connected and fixed with the load-bearing plate, and the rear driving pipe is arranged such that the end of the rear driving pipe is capable of abutting against an inner surface of the rear caster unit so as to drive the rear caster unit to rotate and unfold to the unfolded rolling position during the rotation of the operating handle from the first position to the second position. In this way, when the operating handle is rotated from the first position to the second position, the operating handle will link the connecting rod to change the position of the rear driving pipe, such that the end of the rear driving pipe abuts against the inner side of the rear caster unit, forcing the rear caster unit to rotate and unfold to the unfolded rolling position.

Preferably, the operating handle is provided on a lower surface of the load-bearing plate. The operating handle is provided with a lug, and the lug is connected with a sliding sleeve. The sliding sleeve is sleeved on the connecting rod and is capable of sliding along the connecting rod. A front end and a rear end of the connecting rod are respectively rotatably connected with the front driving pipe and the rear driving pipe. The lug is arranged to be able to drive the connecting rod away from or close to the load-bearing plate when the operating handle is rotated between the first position and the second position. In this way, the sliding sleeve provided on the lug is separated from the pivot axis of the operating handle by a certain distance. When the operating handle is rotated from the first position to the second position, the distance between the sliding sleeve and the load-bearing plate will change, thereby leading change in the distance between the connecting rod and the load-bearing plate, and the connecting rod links the front driving pipe and the rear driving pipe to move and abut against the inner side of the caster unit, forcing the caster unit to unfolded to the unfolded rolling position, so as to realize the unfolding of the caster unit.

Preferably, the operating handle comprises a U-shaped handle body, and the handle body comprises two side arms forming an integrated structure and a grip that is provided between the two side arms and connects one end of each side arm. A rotating shaft and a positioning shaft are further provided between the two side arms, and the rotating shaft is provided at one end of each side arm opposite to the grip. Two mounting platforms for placing the rotating shaft is symmetrically provided on at a position on the lower surface of the load-bearing plate corresponding to the rotating shaft. A semi-circular arc groove is provided on a top surface of the mounting platform. The rotating shaft is placed in the semi-circular arc groove and is then covered and fixed by a pressing plate provided with a semi-circular arc groove. The lower surface of the load-bearing plate is provided with two sets of positioning clips, and the two sets of positioning clips are symmetrically fixed at a position of the lower surface of the load-bearing plate corresponding to the positioning shaft with the rotating shaft as the axis of symmetry. The rotating shaft is capable of being respectively clamped into the two sets of positioning clips to fix the operating handle when the operating handle is located at the first position and the second position.

Preferably, the operating handle is provided on an upper surface of the load-bearing plate, and the operating handle is respectively provided with a first connecting shaft and a second connecting shaft on both sides of the pivot axis of the operating handle. The connecting rod comprises a front connecting rod and a rear connecting rod, and the front connecting rod and the rear connecting rod are staggered arranged in the axial direction of the pivot axis of the operating handle. One end of the front connecting rod is rotatably connected to the front driving pipe, and another end of the front connecting rod is rotatably connected to the first connecting shaft. One end of the rear connecting rod is rotatably connected to the rear drive pipe, and another end of the rear connecting rod is rotatably connected to the second connecting shaft. In this way, when the operating handle is rotated from the first position to the second position, the positions of the first connecting shaft and the second connecting shaft change simultaneously and respectively pull the front connecting rod and the rear connecting rod to act. And the front connecting rod and the rear connecting rod will not interfere with each other during action due to the staggered arrangement. The front connecting rod pulls the front driving pipe to act, forcing the front caster to unfold to the unfolded rolling position, and the rear connecting rod pulls the rear driving pipe to act, forcing the rear caster unit to unfold to the unfolded rolling position, thereby realizing the unfolding of the caster unit.

Preferably, the operating handle comprises a U-shaped handle body, and the handle body comprises two side arms forming an integrated structure and a grip that is provided between the two side arms and connects one end of each side arm. The operating handle is symmetrically provided with cylindrical protruding pillars on inner sides of the two side arms. The cylindrical protruding pillars are rotatably connected with the load-bearing plate, and outer sides of the side arms are respectively provided with a first connecting shaft and a second connecting shaft on both sides of the cylindrical protruding pillar. The connecting rod comprises a front connecting rod and a rear connecting rod, and the front connecting rod and the rear connecting rod are staggered arranged in the axial direction of the pivot axis of the operating handle. A front end and a rear end of the front connecting rod are both provided with circular holes, and the front end of the front connecting rod is sleeved on the front driving pipe and is rotatably connected with the front driving pipe. The rear end of the front connecting rod is sleeved on the first connecting shaft and is rotatably connected with the first connecting shaft. A front end and a rear end of the rear connecting rod are provided with circular holes, and the rear end of the rear connecting rod is sleeved on the rear driving pipe and is rotatably connected with the rear driving pipe. The front end of the rear connecting rod is sleeved on the second connecting shaft and is rotatably connected with the second connecting shaft.

Preferably, ends of the front driving pipe and the rear driving pipe are provided with lock plugs, and the lock plugs are provided with clamping slots. The front caster unit and the rear caster unit are provided with clamping pillars at a position corresponding to the clamping slots, and the clamping pillar is arranged to be inserted into the clamping slot when the front caster unit and the rear caster unit are rotated to the unfolded rolling position. In this way, the position of the front driving pipe and the rear driving pipe can be better maintained after the clamping pillar is inserted into the clamping slot, which avoids the change of the position of the front driving pipe and the rear driving pipe due to external forces such as vibration during the rolling process of the caster unit. The change of the position of the front driving pipe and the rear driving pipe will lead to the unexpected rotation of the caster unit and thereby the unfolded roll position cannot be maintained.

Preferably, the caster unit comprises a fixing sleeve, a rotating block, a caster frame and a caster. A lower part of the fixing sleeve is provided with a notch, and the rotating block is placed in the notch. The fixing sleeve and the rotating block are both sleeved on the load-bearing support frame, and the fixing sleeve is connected and fixed with the load-bearing plate. The caster frame is connected and fixed with the rotating block, and the caster is rotatably mounted on the caster frame. The reset device is torsion spring, and the torsion spring is sleeved on the load-bearing support frame, and both ends of the torsion spring respectively abut against the fixing sleeve and the rotating block, so as to provide a force for a rotation of the rotating block relative to the fixing sleeve. The clamping pillar is arranged on an inner side of the rotating block. In this way, the processing and assembly of the caster unit are facilitated.

The beneficial effect of the present invention as follows:
(1) The caster unit can be folded to reduce the occupied space, which is convenient for carrying and storage;
(2) The folding and unfolding operation of the caster unit is simple, convenient and fast;
(3) The state switching of the push handle will not affect the state of the caster unit, so that the present invention has three working modes, which can cope with various scenarios. The three working mode are as follows: a platform mode in which the push handle is received on the upper surface of the load-bearing plate, a platform pushing mode in which the push handle is relatively vertical to the load-bearing plate at 90 degrees, and a platform dragging mode in which the push handle is rotated more than 90 degrees and less than 180 degrees relative to the load-bearing plate, which are able to meet the various transportation needs of users.

DETAILED DESCRIPTION

Figure 1:
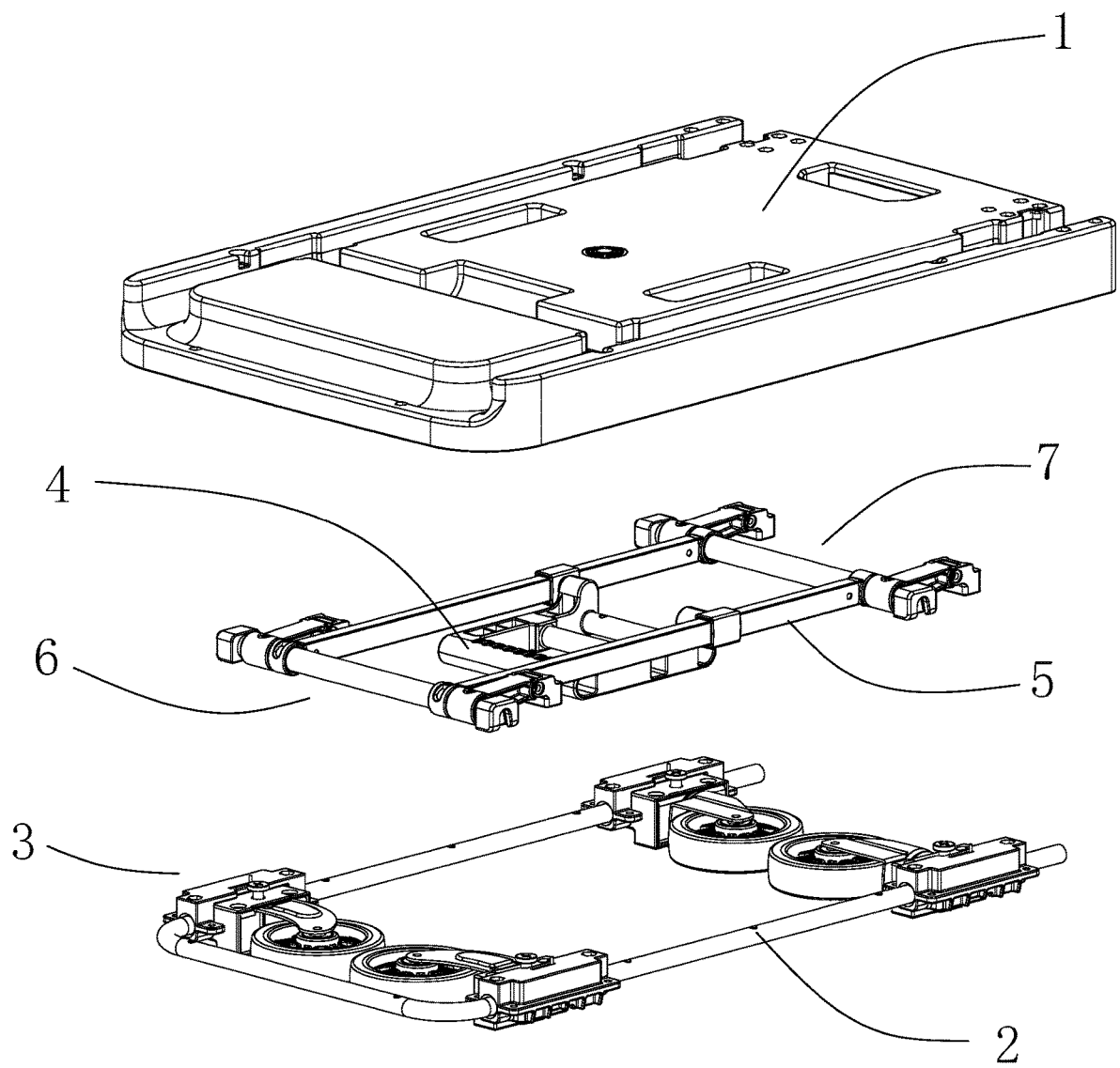
FIG. 1 is a schematic diagram of an exploded structure of Embodiment 1 of the present invention.

The present invention will be further described below with reference to the accompanying drawings. The drawings are for illustrative purposes only and should not be construed as limiting the patent.

In order to describe the present embodiment more concisely, some components known to those skilled in the art but not related to the main content of the present invention will be omitted in the drawings or descriptions. In addition, for the convenience of description, some parts and components in the drawings are omitted, enlarged or reduced, but they do not represent the size or overall structure of the actual product.

Embodiment 1

Figure 2:
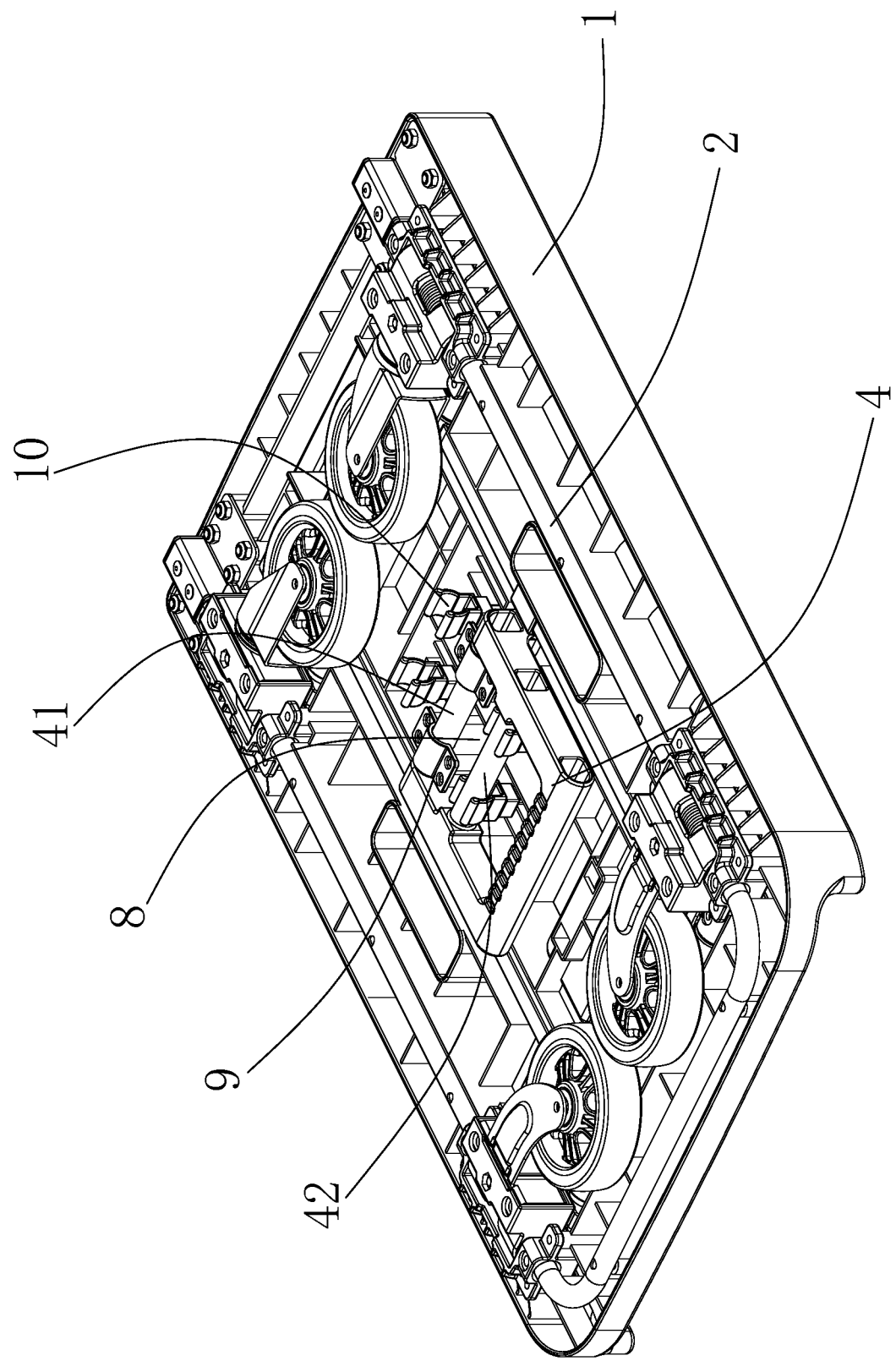
FIG. 2 is a schematic diagram of the bottom structure of Embodiment 1 of the present invention.

As shown in FIG. 1 and FIG. 2, the present invention provides a flatbed truck with a foldable caster unit, which comprises a load-bearing plate 1, a load-bearing support frame 2 and a caster unit 3. The load-bearing support frame 2 is arranged at the bottom of the load-bearing plate 1, so the caster unit 3 is mounted on the load-bearing support frame 2 and is rotatable around a pivot axis of a corresponding wheel unit between a folded storage position and an unfolded rolling position. The load-bearing support frame 2 is a U-shaped frame bent from a round pipe. The caster unit 3 comprises two front caster units arranged at the front portion of the load-bearing support frame 2 and two rear caster units arranged at the rear portion of the load-bearing support frame 2. The caster unit 3 is linked with a caster unit rotation drive device, and the caster unit rotation driving device comprises an operating handle 4, a connecting rod 5, a front linkage mechanism 6 and a rear linkage mechanism 7.

As shown in FIG. 2, the operating handle 4 is provided on the lower surface of the load-bearing plate 1. The operating handle 4 comprises a U-shaped handle body, and the handle body comprises two side arms forming an integrated structure and a grip that is provided between the two side arms and connects one end of each side arm. A rotating shaft 41 and a positioning shaft 42 are further provided between the two side arms. The rotating shaft 41 is provided at one end of each side arm opposite to the grip. Two mounting platforms 8 for placing the rotating shaft 41 are symmetrical provided on at a position on the lower surface of the load-bearing plate corresponding to the rotating shaft 41. The distance between the outer sides of the two mounting platforms 8 is equivalent to the axial length of the rotating shaft 41. A semi-circular arc groove is provided on a top surface of the mounting platform 8. The rotating shaft 41 is placed in the semi-circular arc groove and is then covered and fixed by a pressing plate 9 provided with a semi-circular arc groove. The pressing plate 9 is fixed with the mounting platform 8 by screws. And the lower surface of the load-bearing plate 1 is provided with two sets of positioning clips 10, and the two sets of positioning clips 10 are symmetrically fixed at the position of the lower surface of the load-bearing plate 1 corresponding to the positioning shaft 42 with the rotating shaft 41 as the axis of symmetry. The positioning shaft 42 is capable of being clamped into the positioning clips 10 to fix the operating handle 4. When the positioning shaft 42 of the operating handle 4 is clamped into the two sets of positioning clips 10, the position of the operating handle 4 is correspondingly to be the first position and the second position. That is, when the operation handle 4 is parallel to the load-bearing plate 1, the first position corresponds to the position of the operating handle 4 when the positioning shaft 42 is located to the left of the rotating shaft 41, and the second position corresponds to the position of the operating handle 4 when the positioning shaft 42 is located to the right of the rotating shaft 41.

Figure 3:
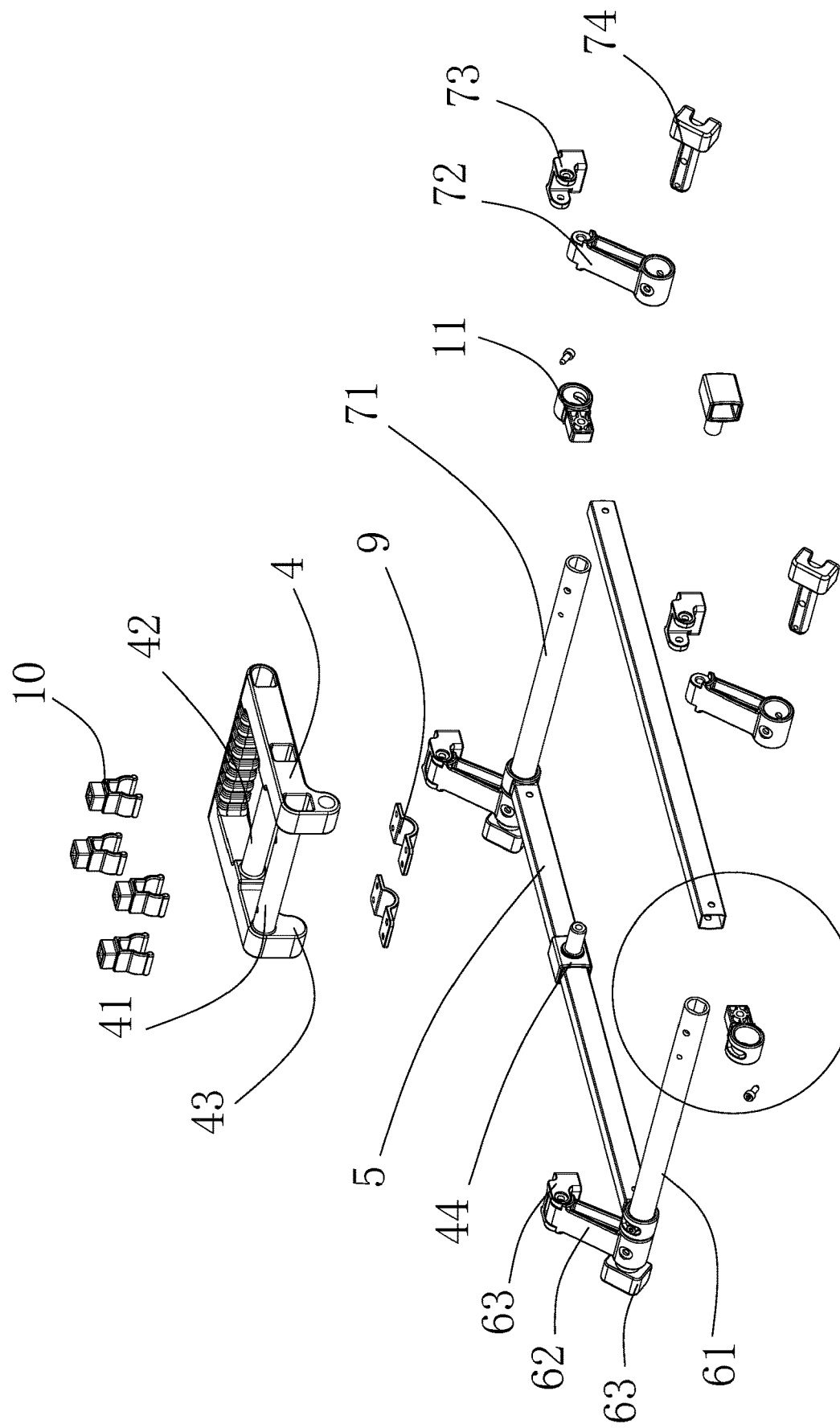
FIG. 3 is a schematic diagram of an exploded structure of the rotation driving device of the caster unit according to Embodiment 1 of the present invention.

As shown in FIG. 3, one end of the side arm of the operating handle 4, where the rotating shaft 41 is provided, is provided with a lug 43. The lug 43 is perpendicular to the side arm, and a free end of the lug 43 is connected with a sliding sleeve 44. The sliding sleeve 44 is sleeved on the connecting rod 5 and is capable of sliding along the connecting rod 5. In the present embodiment, the connecting rod 5 is an elongated square pipe, and rotating sleeves 11 are inserted into and mounted into both the front end and the rear end of the connecting rod 5. In this embodiment, the front linkage mechanism 6 comprises a front driving pipe 61, a front supporting arm 62 and a front fixing base 63. The front driving pipe 61 is rotatably connected with the connecting rod 5. One end of the front supporting arm 62 is connected and fixed with the front driving pipe 61. Another end of the front supporting arm 62 is pivotally connected with the front fixing base 63. The front fixing base 63 is connected and fixed with the load-bearing plate 1. The rear linkage mechanism 7 comprises a rear driving pipe 71, a rear supporting arm 72 and a rear fixing base 73. The rear driving pipe 71 is rotatably connected with the connecting rod 5. One end of the rear supporting arm 72 is connected and fixed with the rear driving pipe 71. Another end of the rear supporting arm 72 is pivotally connected with the rear fixing base 73. The rear fixing base 73 is connected and fixed with the load-bearing plate 1.

Figure 4:
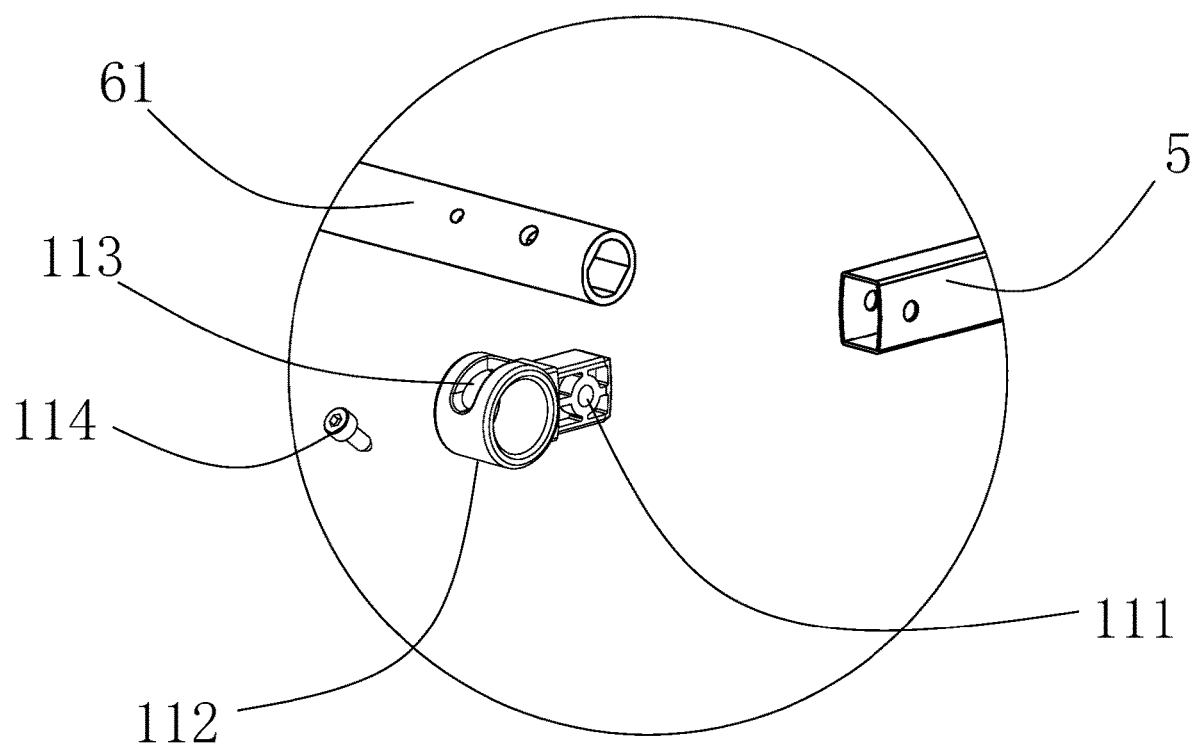
FIG. 4 is a schematic enlarged diagram of the structure of part A of FIG. 3.

As shown in FIG. 4, the rotating sleeve 11 comprises a lantern ring 112 and a plug 111 which form an integrated structure. The plug 111 is inserted and mounted into the end of the connecting rod 5 and is fixed to the connecting rod 5. And the lantern ring 112 of the rotating sleeve 11 at the front end of the connecting rod 5 is sleeved on the front driving pipe 61 and is capable of rotating relative to the front driving pipe 61. The lantern ring 112 of the rotating sleeve 11 at the rear end of the connecting rod 5 is sleeved on the rear driving pipe 71 and is capable of rotating relative to the rear driving pipe 71. The ring wall of the lantern ring 112 is provided with an elongated through hole 113 arranged along the circumference. A limit screw 114 threadedly connected and fixed with the driving pipe is provided in the elongated through hole 113. The cooperation between the holes 113 and the limit screw 114 can prevent the rotating sleeve 11 from moving in the axial direction of the driving pipe and limit the rotation angle of the rotating sleeve 11 relative to the driving pipe.

Figure 5:
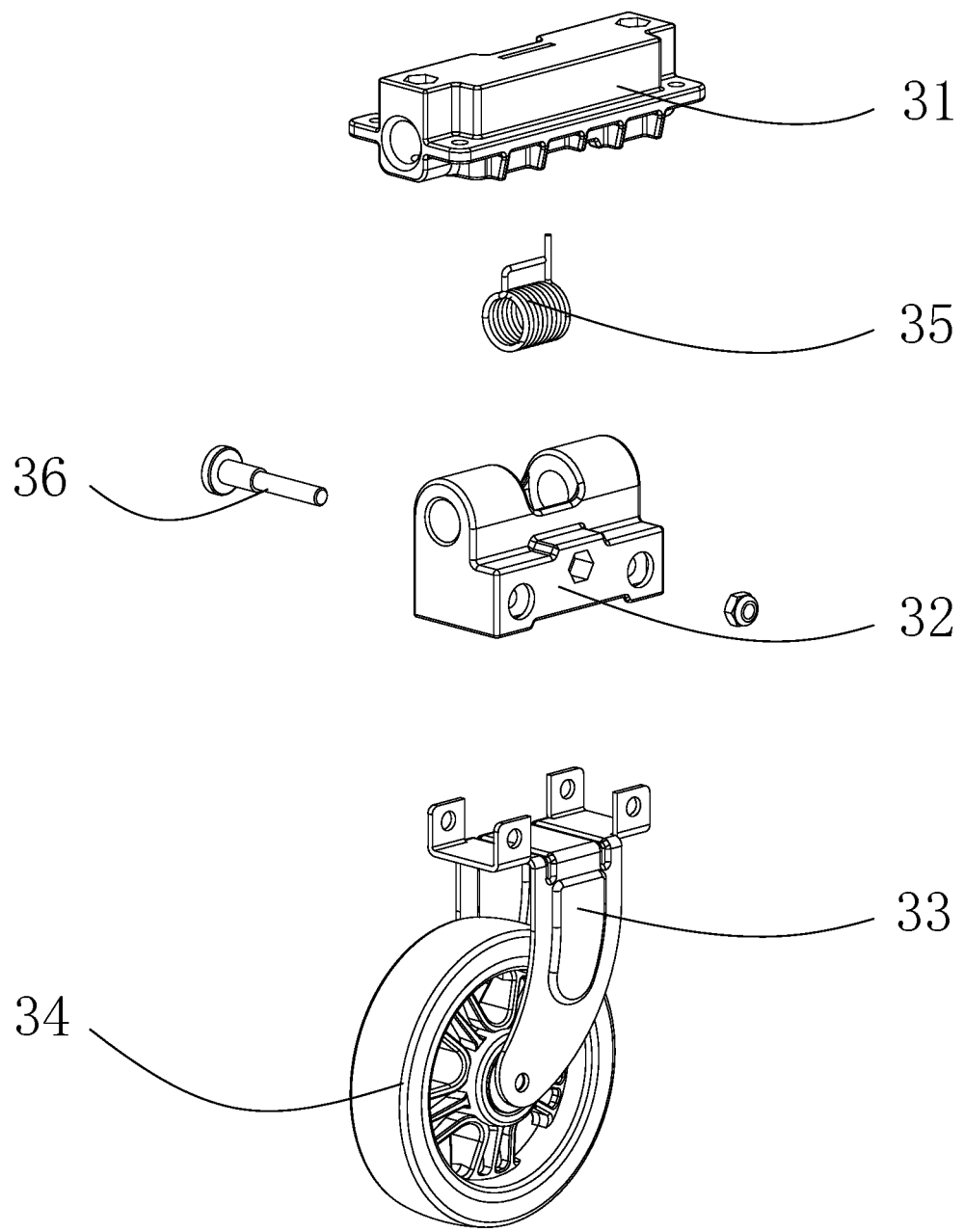
FIG. 5 is a schematic diagram of the exploded structure of the caster unit according to Embodiment 1 of the present invention.

As shown in FIG. 5, in the present embodiment, the caster unit 3 comprises a fixing sleeve 31, a rotating block 32, a caster frame 33, a caster 34 and a reset device. The lower part of the fixing sleeve 31 is provided with a notch. The rotating block 32 is placed in the notch. The fixing sleeve 31 and the rotating block 32 are both sleeved on the load-bearing support frame 2, and the fixing sleeve 31 is connected and fixed with the load-bearing plate 1. The caster frame 33 is connected and fixed with the rotating block 32. The caster 34 is rotatably mounted on the caster frame 33. The reset device is a torsion spring 35. The torsion spring 35 is sleeved on the load-bearing support frame 2, and both ends of the torsion spring 35 respectively abut against the fixing sleeve 31 and the rotating block 32, so as to provide an elastic force for a rotation and reset of the rotating block 32 relative to the fixing sleeve 31. The inner side of the rotating block 32 is provided with a clamping pillar 36. The clamping pillar 36 has a stepped pillar body. The clamping pillar 36 is fixed to the rotating block 32 by tightening a nut after passing through the rotating block 32.

Figure 6:
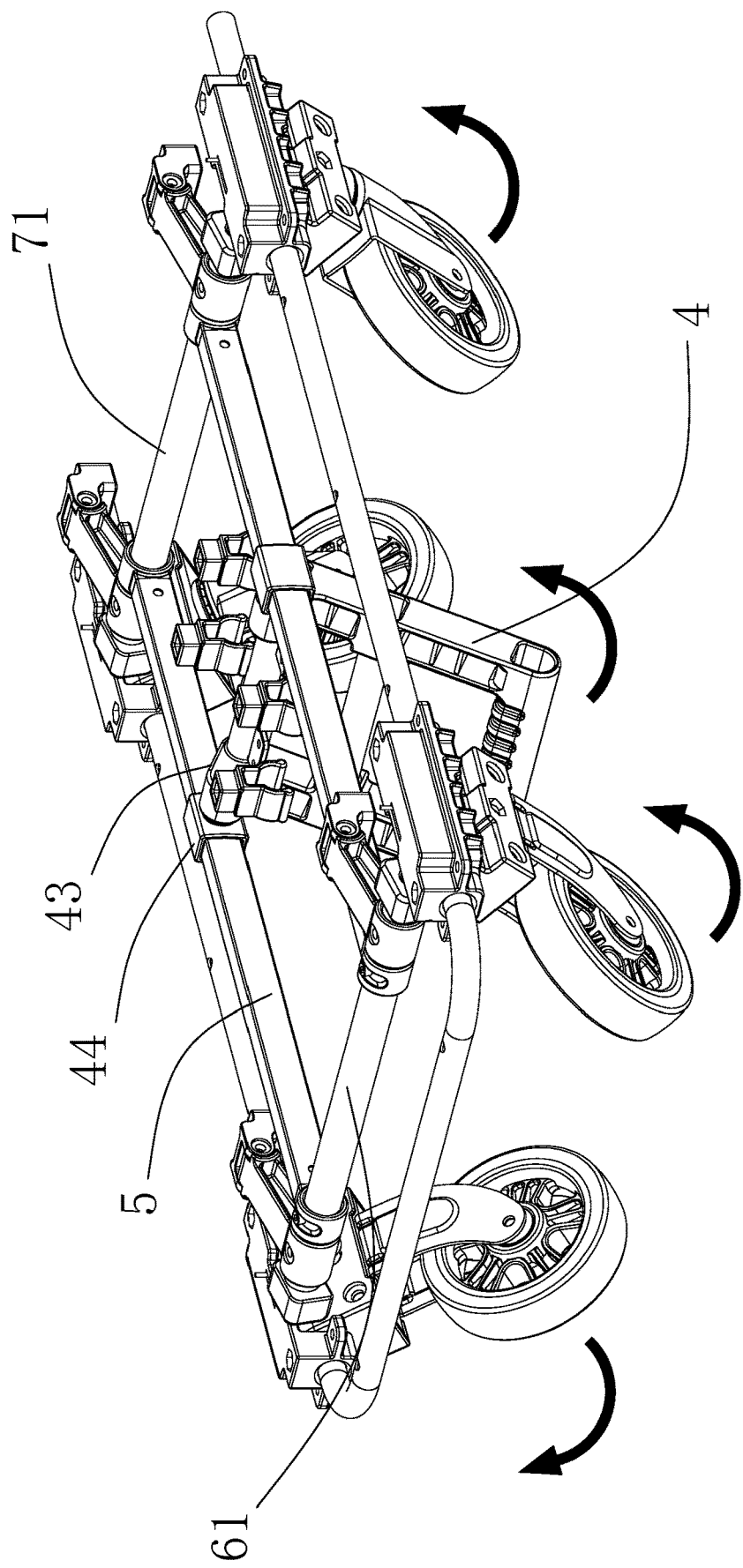
FIG. 6 is a schematic structural diagram of the rotation process of the operating handle from the first position to the second position, omitting the load-bearing plate, according to Embodiment 1 of the present invention.
Figure 7:
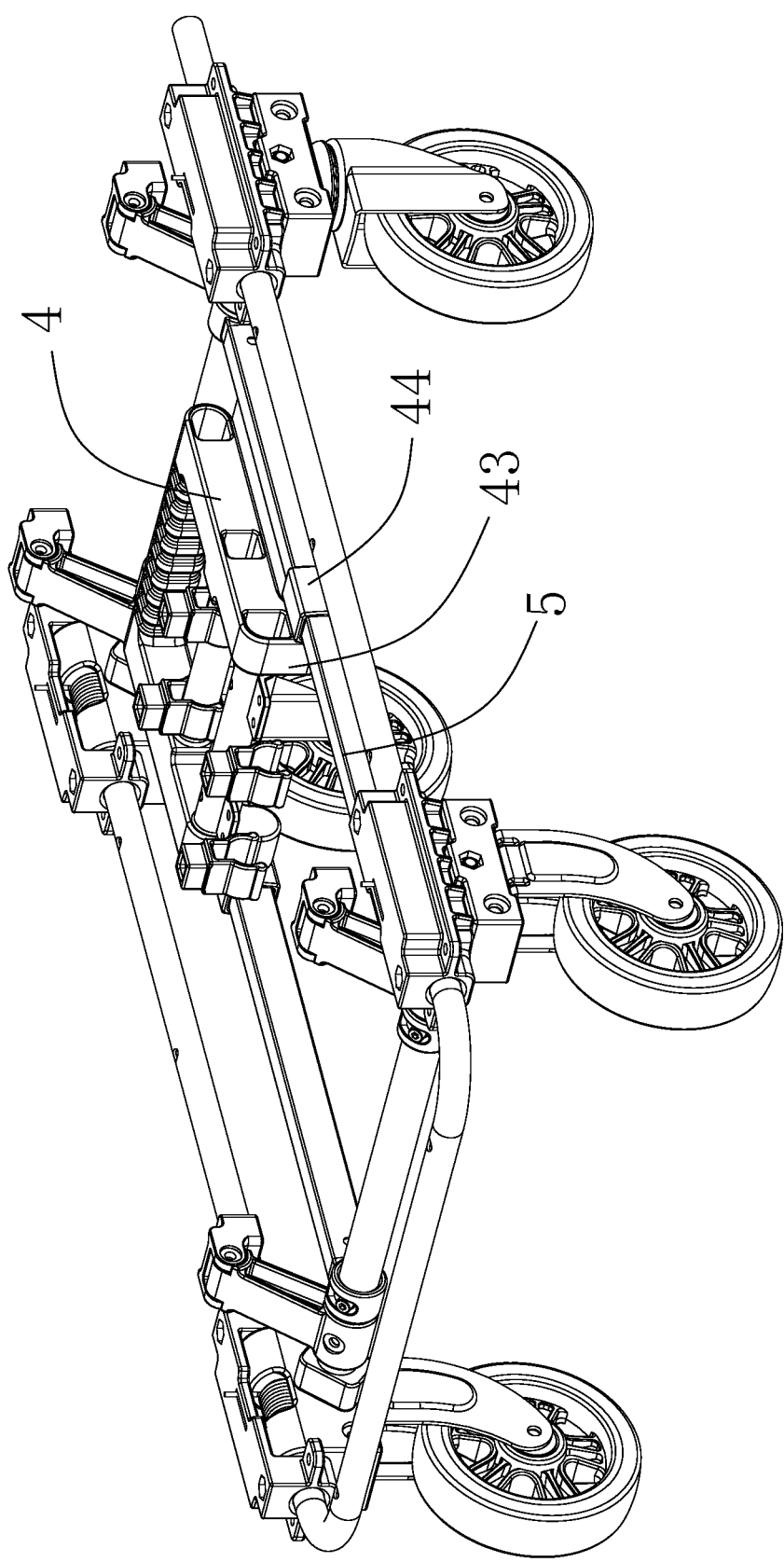
FIG. 7 is a schematic structural diagram of Embodiment 1 of the present invention when the operating handle is in the second position and the caster unit is in the unfolded rolling position, omitting the load-bearing plate.

As shown in FIG. 6 and FIG. 7, when the operating handle 4 is rotated from the first position to the second position, the lug 43 is switched from an upward state of the first position to a downward state of the second position. And the sliding sleeve 44 drives the connecting rod 5 downward away from the load-bearing plate 1 while sliding axially along the connecting rod 5. The connecting rod 5 drives the front driving pipe 61 and the rear driving pipe 71 to rotate around the pivot axis of the supporting arm. Both ends of the front driving pipe 61 abut against the inner side of the rotating blocks 32 of the two front wheel units, forcing the rotating blocks 32 to rotate relative to the fixing sleeve 31 so as to realize that the two front wheel units unfold to the unfolded rolling position. At the same time, both ends of the rear driving pipe 71 abut against the inner side of the rotating blocks 32 of the two rear wheel units, forcing the rotating blocks 32 to rotate relative to the fixing sleeve 31 so as to realize that the two rear wheel units unfold to the unfolded rolling position. On the contrary, when the operating handle 4 is rotated from the second position to the first position, the lug 43 is switched from the downward state of the second position to the upward state of the first position. And the sliding sleeve 44 drives the connecting rod 5 upwards to approach the load-bearing plate 1 while sliding axially along the connecting rod 5. The connecting rod 5 drives the front driving pipe 61 and the rear driving pipe 71 to rotate around the pivot axis of the supporting arm, and both ends of the front driving pipe 61 are separated from the inner side of the rotating blocks 32 of the two front wheel units. The two front wheel units are rotated and reset to the folded storage position under the action of the torsion spring 35, while both ends of the rear driving pipe 71 are separated from the inner side of the rotating blocks of the two rear wheel units. And the two rear wheel units is rotated and reset to the folded storage position under the action of the torsion spring 35.

Figure 8:
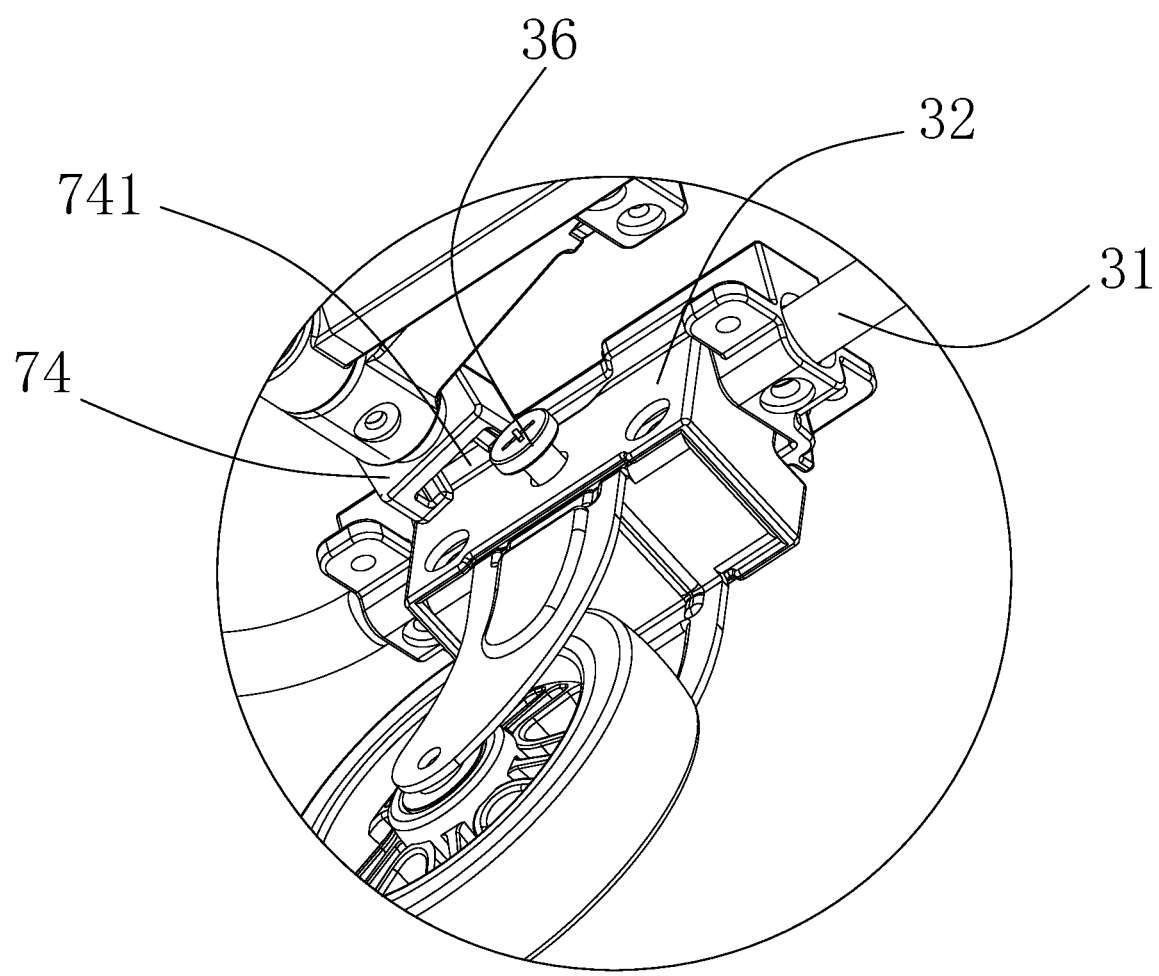
FIG. 8 is a schematic structural diagram of the lock plug cooperating with the clamping pillar according to Embodiment 1 of the present invention.

As shown in FIG. 8, as a further improvement, ends of the front driving pipe 61 and the rear driving pipe 71 are provided with lock plugs 74 that cooperate with a clamping pillar 36 provided at the inner side of the rotating block 32. The lock plug 74 is provided with a clamping slot 741, and the locking pillar 36 can be locked into the clamping slot 741 when the front caster unit and the rear caster unit are rotated to the unfolded rolling position.

Embodiment 2

Figure 9:
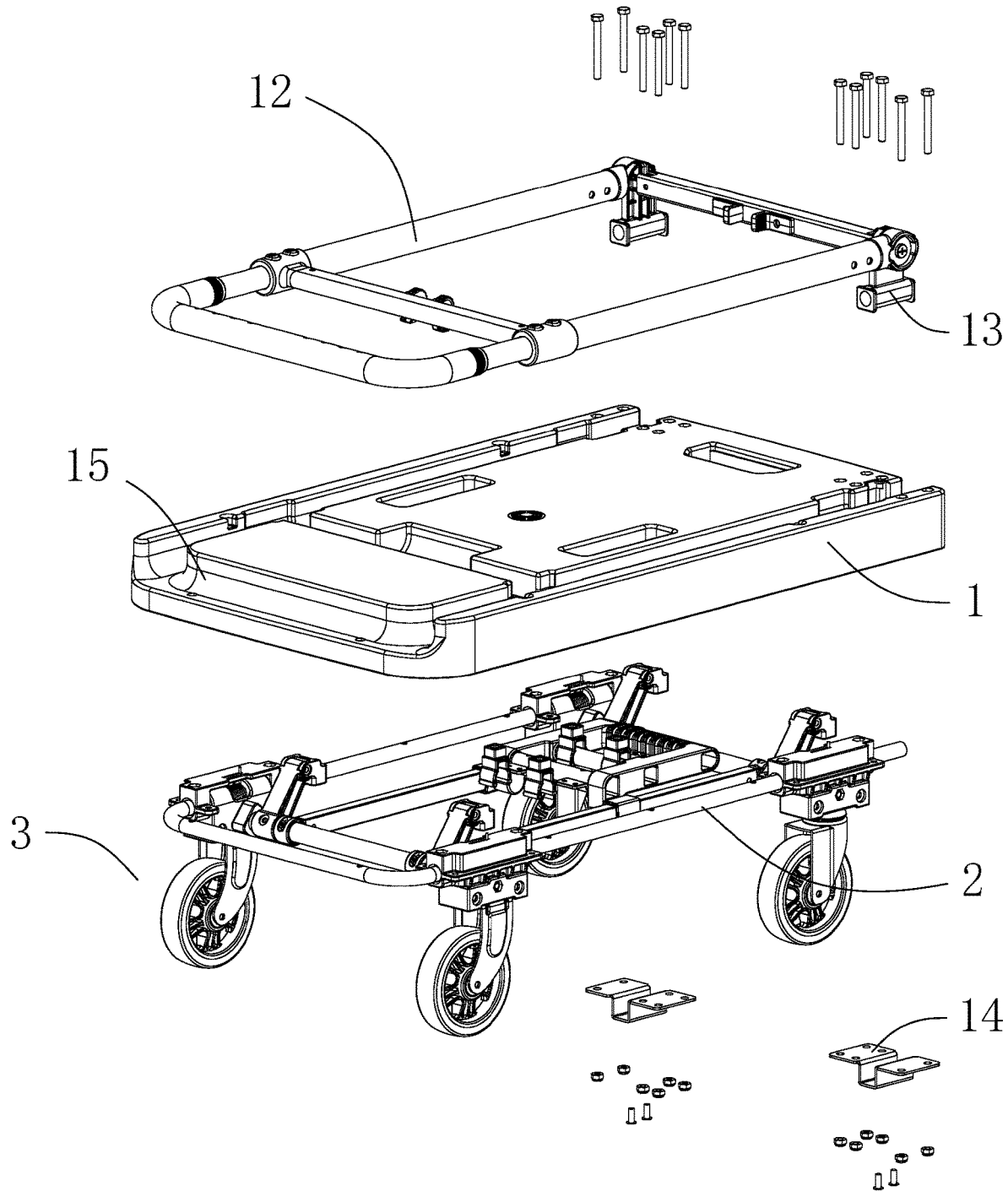
FIG. 9 is a schematic diagram of an exploded structure of Embodiment 2 of the present invention.
Figure 10:
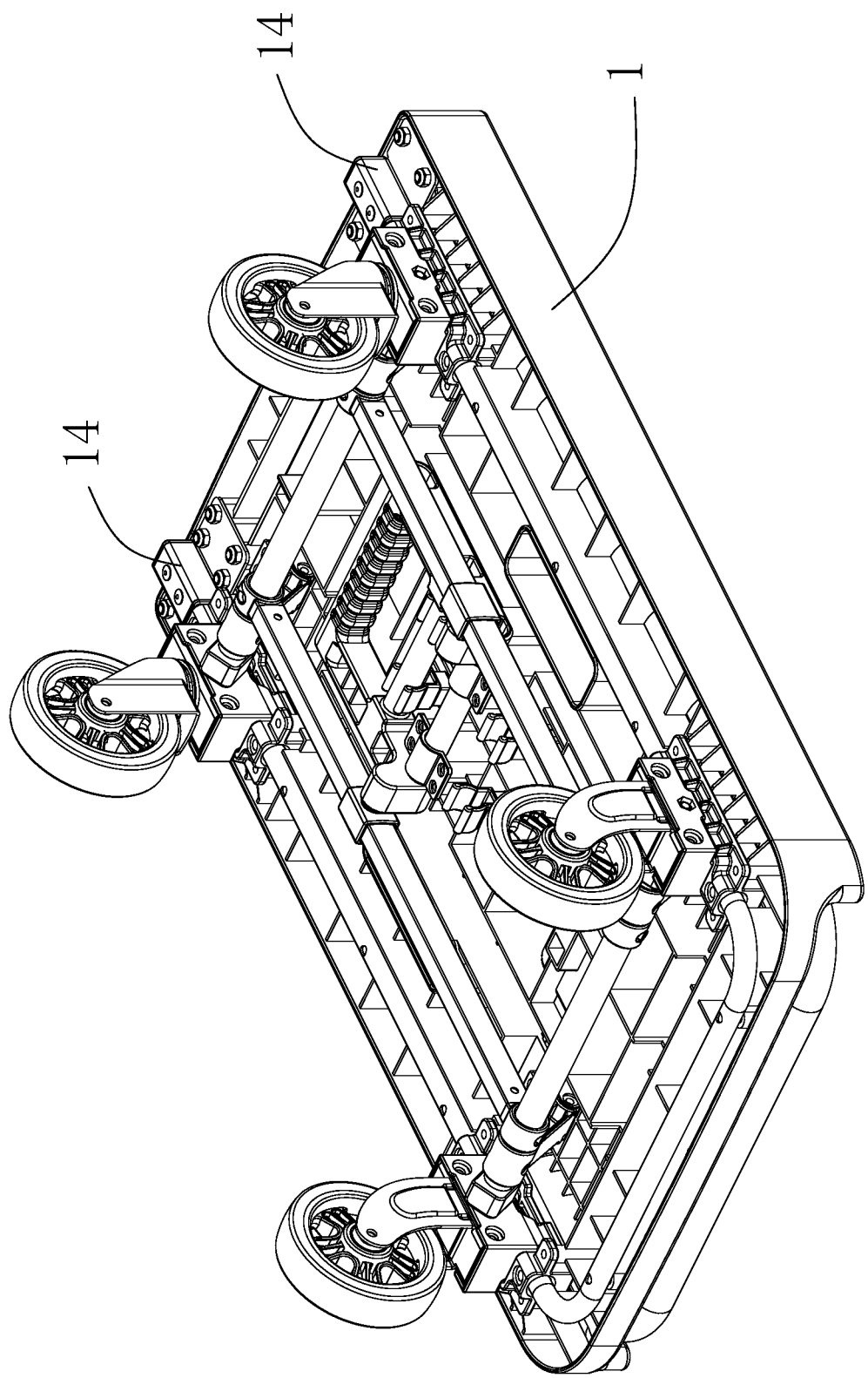
FIG. 10 is a schematic diagram of the mounting of the fixing plate at the bottom of the load-bearing plate according to Embodiment 2 of the present invention.

As shown in FIG. 9 and FIG. 10, the present embodiment is similar to Embodiment 1, except that a push handle 12 is provided on an upper surface of the load-bearing plate 1, and the push handle 12 comprises two vertical rods. Bottom ends of the two vertical rods are both pivotally connected with a fixing base 13, and the fixing base 113 is sleeved on the load-bearing support frame 1 at a position behind the rear caster unit. The fixing base 13 is fixed by a fixing plate 14 which is provided at a lower surface of the load-bearing plate 1 and connected and fixed with the load-bearing plate 1 and the fixing base 13. The fixing plate 14 is connected and fixed with the load-bearing plate 1 and the fixing base 13 by screws. The push handle 12 is capable of rotating around the pivot axis of the push handle. A receiving groove 15 for receiving the push handle 12 is provided on the upper surface of the load-bearing plate 1. When the push handle 12 is received in the receiving groove 15, the surface of the push handle 12 is flush with or is lower than the upper surface of the load-bearing plate 1.

Figure 11:
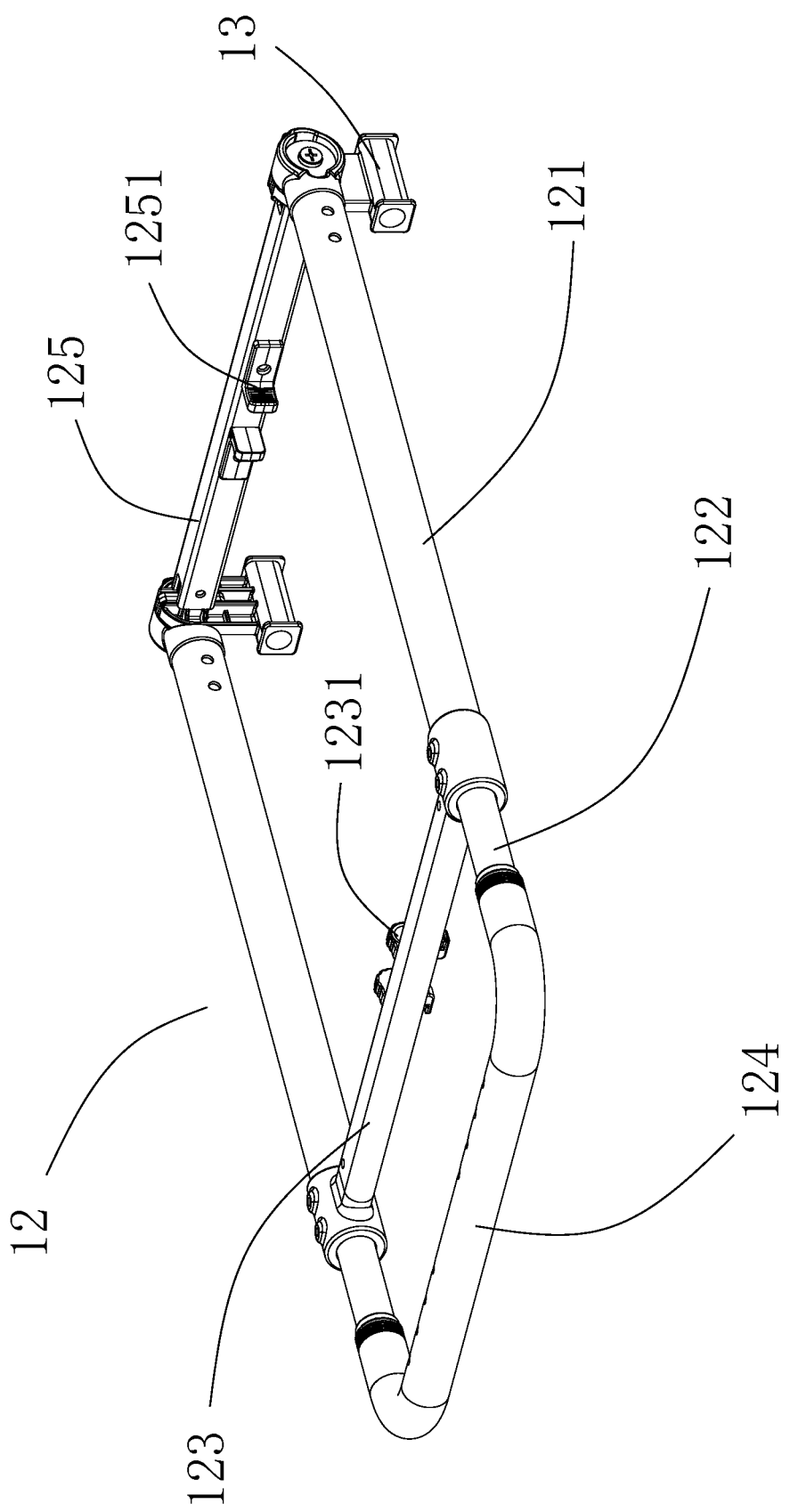
FIG. 11 is a schematic structural diagram of the push handle according to Embodiment 2 of the present invention.

As shown in FIG. 11, in the present embodiment, the two vertical rods are two-stage telescopic rods. The telescopic rods include a lower rod 121 and an upper rod 122, and a first transverse rod 123 is connected to top ends of two lower rods 121. The first transverse rod 123 is provided with an upper rod locking mechanism 1231 capable of locking the upper rod 122. The upper rod locking mechanism 1231 includes a locking pin and a return spring placed in the first transverse rod, and a control push block which is located outside the first transverse rod and connected with the locking pin. A second transverse rod 124 is connected to top ends of two upper rods 122, and the second transverse rod 124 is used for the user to grasp and operate the push handle 12. The control push block is provided with a hook. When the push handle 12 is received in the receiving groove 15, the hook can be engaged with the load-bearing plate 1 to fix the push handle 12. A reinforcing rod 125 is connected between the two fixing bases 13. The reinforcing rod 125 is provided with a locking mechanism 1251 capable of locking the rotation of the push handle 12. The locking mechanism 1251 is similar to the upper rod locking mechanism 1231, and the difference between them lies in that the control push block of the locking mechanism 1251 is not provided with a hook.

Figure 12:
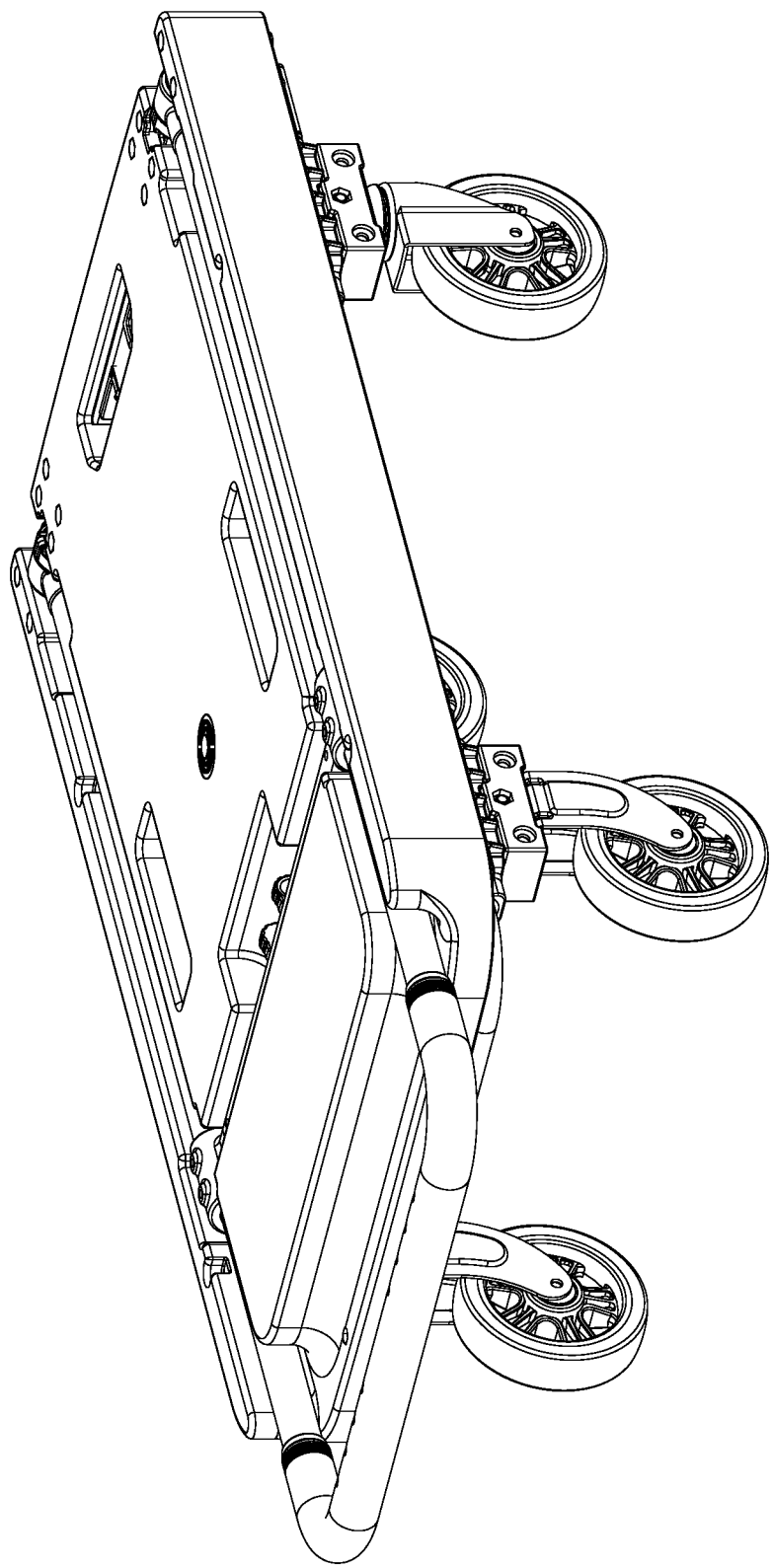
FIG. 12 is a schematic diagram of a platform mode according to Embodiment 2 of the present invention.
Figure 13:
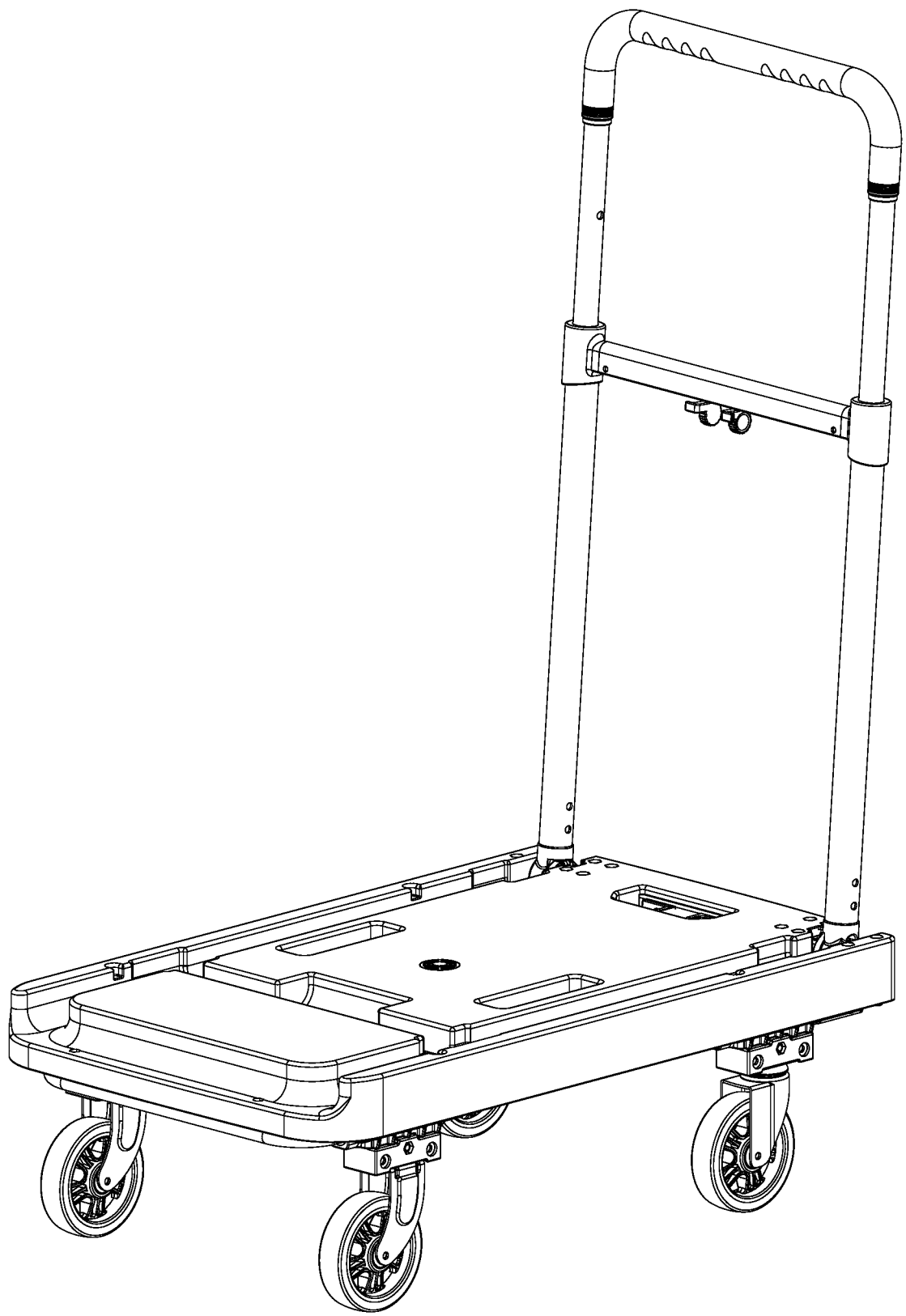
FIG. 13 is a schematic diagram of a platform pushing mode according to Embodiment 2 of the present invention.
Figure 14:
FIG. 14 is a schematic diagram of a platform dragging mode according to Embodiment 2 of the present invention.

As shown in FIG. 12 to FIG. 14, when the push handle 12 is received in the receiving groove 15, is at a position of 90 degrees perpendicular to the load-bearing plate 1, and is at a position where the rotation angle relative to the load-bearing plate 1 is 135 degrees, the locking mechanism 1251 may lock the push handle 12 relative to the bearing plate 1 until no rotation could happen. By the cooperation of the push handle 12 with the locking mechanism 1251, the flatbed truck with the foldable caster unit provided in the present embodiment has three working modes, which specifically are a platform mode when the push handle 12 is received in the receiving groove 15, a platform pushing mode when the push handle 12 is vertical to the load-bearing plate 1 at 90 degrees, and a platform dragging mode when the push handle 12 is rotated 135 degrees relative to the load-bearing plate 1.

Embodiment 3

The present embodiment is similar to Embodiment 1, and the difference lies in that the structures of the operating handle and the connecting rod of present embodiment are different from those of Embodiment 1.

Figure 15:
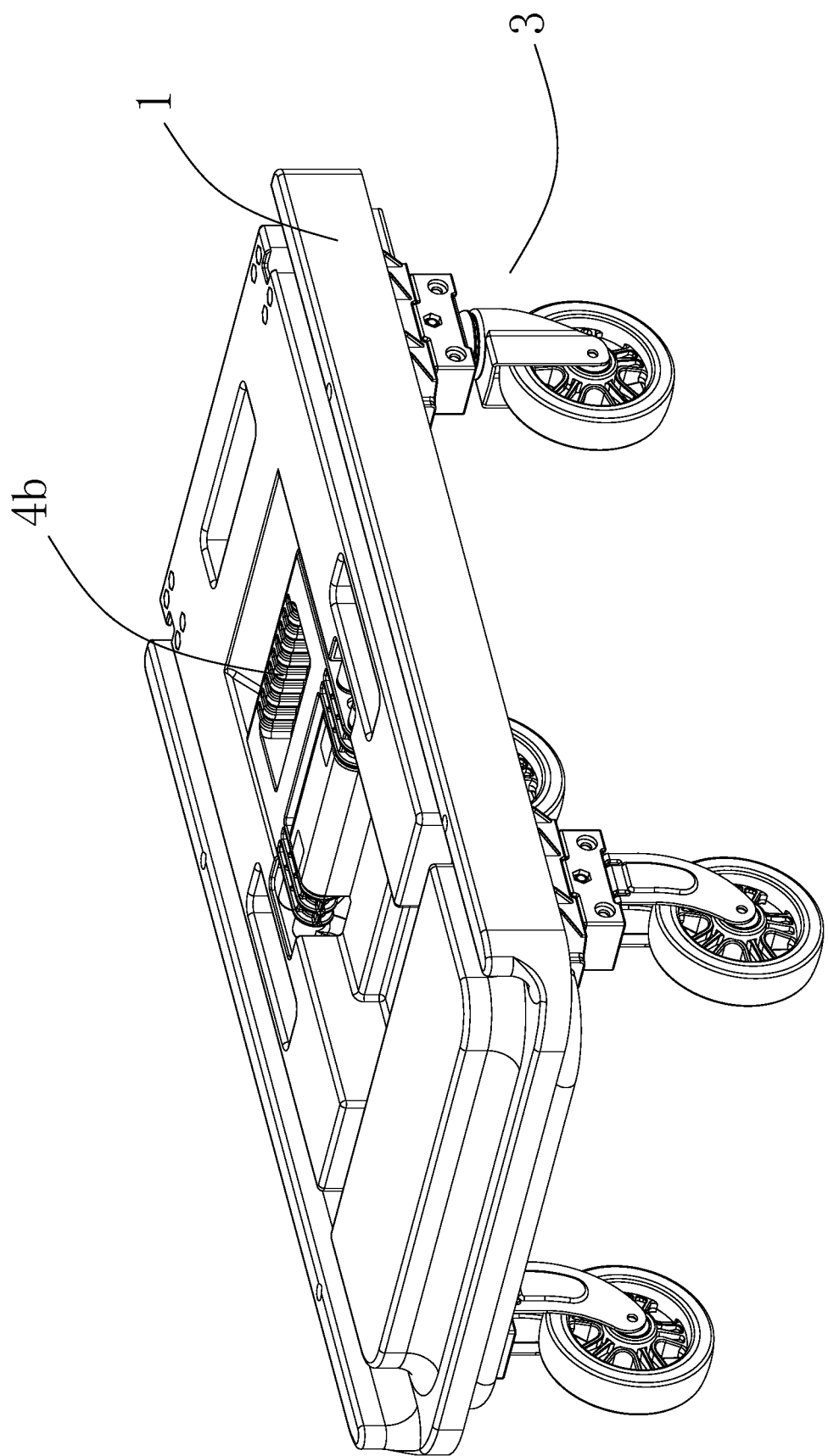
FIG. 15 is a schematic structural diagram of Embodiment 3 of the present invention when the operating handle is in the second position and the caster unit is in the unfolded rolling position.
Figure 16:
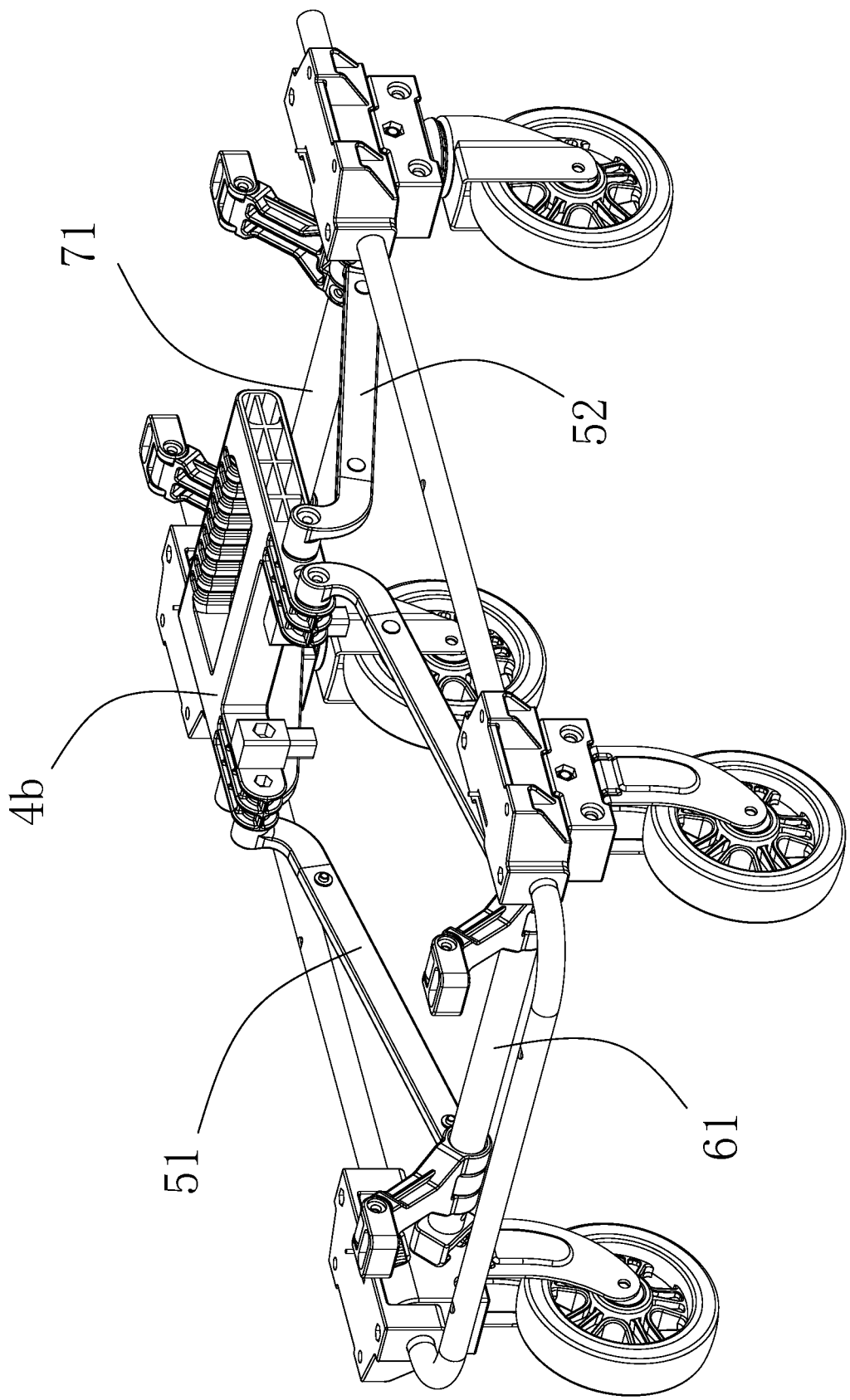
FIG. 16 is a schematic structural diagram of Embodiment 3 of the present invention when the operating handle is in the second position and the caster unit is in the unfolded rolling position, omitting the load-bearing plate.
Figure 17:
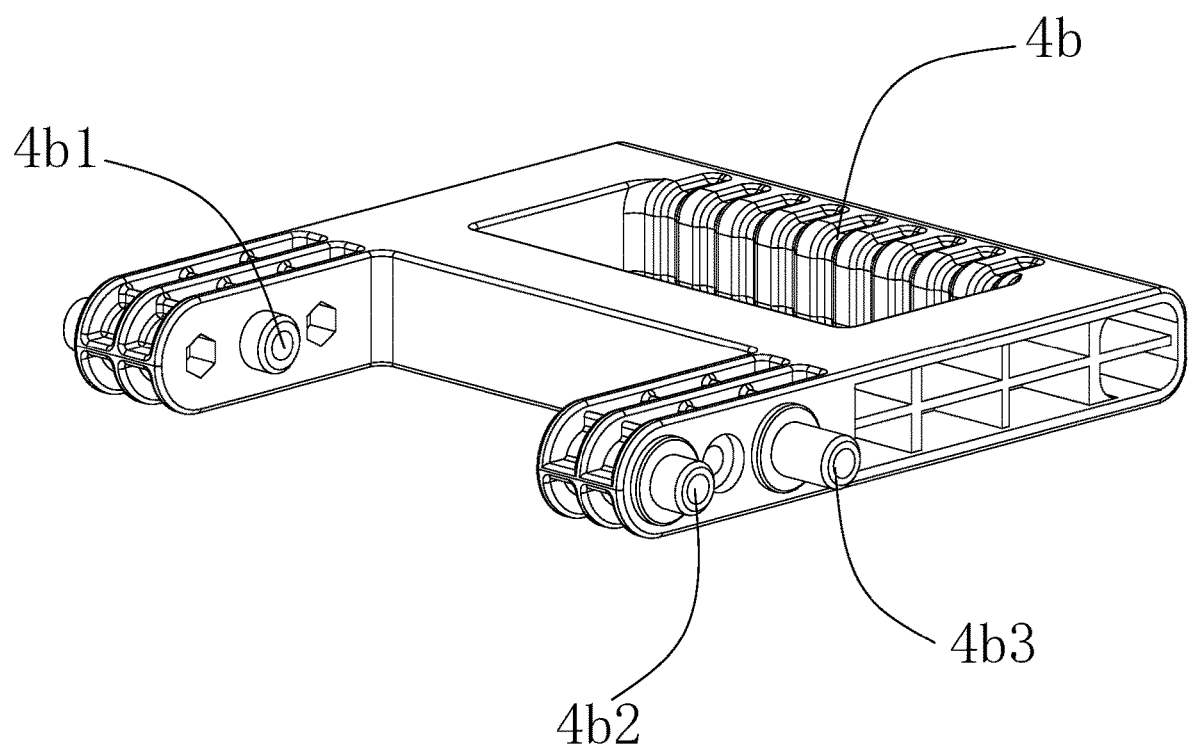
FIG. 17 is a schematic structural diagram of the operating handle according to Embodiment 3 of the present invention.

As shown in FIG. 15 to FIG. 17, in present embodiment, the operating handle 4b is provided on the upper surface of the load-bearing plate 1. The operating handle 4b includes a U-shaped handle body, and the handle body includes two side arms forming an integrated structure, and a grip that is provided between the two side arms and connects one end of each side arm. The operating handle 4b is symmetrically provided with cylindrical protruding pillars 4b1 on inner sides of the two side arms. The cylindrical protruding pillars 4b1 are rotatably connected with the load-bearing plate, and outer sides of the side arms are respectively provided with a first connecting shaft 4b2 and a second connecting shaft 4b3 on both sides of the cylindrical protruding pillar 4b1. The connecting rod includes a front connecting rod 51 and a rear connecting rod 52. The front connecting rod 51 and the rear connecting rod 52 are staggered arranged in the axial direction of the pivot axis of the operating handle 4b. A front end and a rear end of the front connecting rod 51 are provided with circular holes. The front end of the front connecting rod 51 is sleeved on the front driving pipe 61 and is rotatably connected with the front driving pipe 61. The rear end of the front connecting rod 51 is sleeved on the first connecting shaft 4b2 and is rotatably connected with the first connecting shaft 4b2. A front end and a rear end of the rear connecting rod 52 are provided with circular holes, and the rear end of the rear connecting rod 52 is sleeved on the rear driving pipe 71 and is rotatably connected with the rear driving pipe 71. The front end of the rear connecting rod 52 is sleeved on the second connecting shaft 4b3 and is rotatably connected to the second connecting shaft 4b3. In this way, when the operating handle 4b is turned by 180 degrees from the first position parallel to the load-bearing plate 1 to the second position, the positions of the first connecting shaft 4b2 and the second connecting shaft 4b3 change simultaneously and respectively pull the front connecting rod 51 and the rear connecting rod 52 to act. And the front connecting rod 51 and the rear connecting rod 52 will not interfere with each other during action due to the staggered arrangement. The front connecting rod 51 pulls the front driving pipe 61 to act, forcing the front caster to unfold to the unfolded rolling position, and the rear connecting rod 52 pulls the rear driving pipe 71 to act, forcing the rear caster unit to unfold to the unfolded rolling position, thereby realizing the unfolding of the caster unit 3.

Embodiment 4

Figure 18:
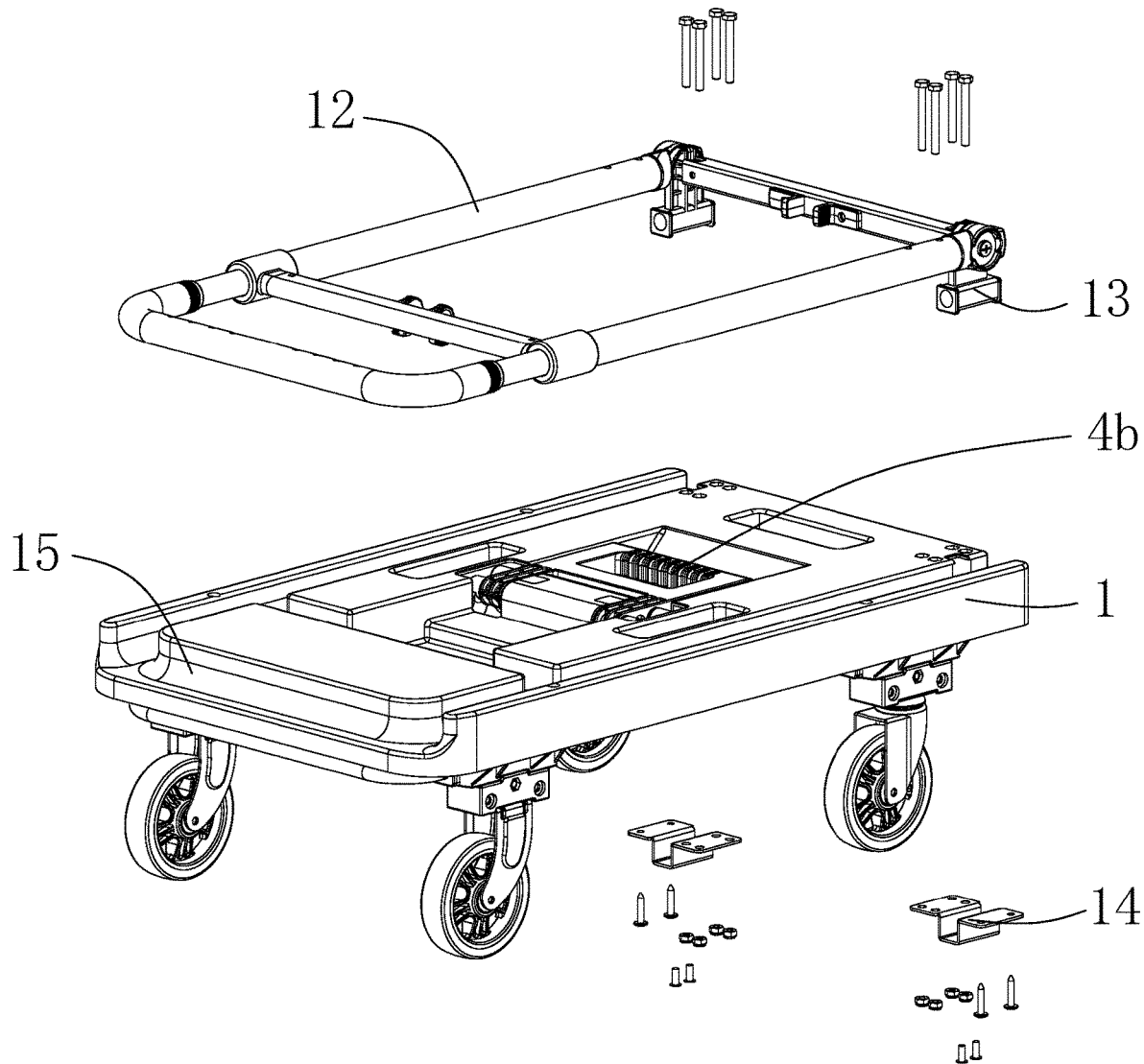
FIG. 18 is a schematic diagram of an exploded structure of Embodiment 4 of the present invention.

As shown in FIG. 18, the present embodiment is similar to Embodiment 3, the difference lies in that a push handle 12 is provided on the upper surface of the load-bearing plate 1. The structure of the push handle 12, and the connecting manner between the push handle 12 and the load-bearing plate 1 in the present embodiment is similar to that of Embodiment 2.

The embodiments of the present invention described above do not limit the protection scope of the present invention. Any modifications, equivalent replacements and improvements made within the spirit and principles of the present invention shall be included within the protection scope of the claims of the present invention.

What is claimed is:

1. A flatbed truck with a foldable caster unit, comprising a load-bearing plate, a load-bearing support frame and a caster unit, the load-bearing support frame being arranged at a bottom of the load-bearing plate, and the caster unit being mounted on the load-bearing support frame and is rotatable around a pivot axis of a corresponding wheel unit between a folded storage position and an unfolded rolling position, the caster unit comprising a front caster unit and a rear caster unit, wherein the flatbed truck with the foldable caster unit further comprises a caster unit rotation driving device, and the caster unit rotation driving device comprises an operating handle, a connecting rod, a front linkage mechanism and a rear linkage mechanism, wherein the operating handle is pivotally connected with the load-bearing plate and is rotatable around a pivot axis of the operating handle, the connecting rod is linked with the operating handle, and the front linkage mechanism is linked with the connecting rod and the front caster unit, the rear linkage mechanism is linked with the connecting rod and the rear caster unit, the operating handle is capable of linking with the front linkage mechanism and the rear linkage mechanism via the connecting rod to respectively drive the front caster unit and the rear caster unit to be rotated from the folded storage position to the unfolded rolling position, when the operating handle is rotated from a first position to a second position; the front caster unit and rear caster unit are both provided with a reset device, the front caster unit and the rear caster unit are capable of being rotated from the unfolded rolling position to the folded storage position under an action of the reset device, when the operating handle is rotated from the second position to the first position, wherein the front linkage mechanism comprises a front driving pipe, a front supporting arm and a front fixing base, and the front driving pipe is rotatably connected with the connecting rod, one end of the front supporting arm is connected and fixed with the front driving pipe, another end of the front supporting arm is pivotally connected with the front fixing base, the front fixing base is connected and fixed with the load-bearing plate, and the front driving pipe is arranged such that the end of the front driving pipe is capable of abutting against an inner surface of the front caster unit so as to drive the front caster unit to rotate and unfold to the unfolded rolling position during an rotation of the operating handle from the first position to the second position.

2. The flatbed truck with the foldable caster unit according to claim 1, wherein a push handle is provided on an upper surface of the load-bearing plate, the push handle comprises two vertical rods, and bottom ends of the two vertical rods are both pivotally connected with fixing bases, the fixing bases are sleeved on the load-bearing support frame and are fixed at a position behind the rear caster unit, the push handle is capable of being rotated around a pivot axis of the push handle, and the two fixing bases are connected with a reinforcing rod, the reinforcing rod is provided with a locking mechanism capable of locking the push handle from rotating.

3. The flatbed truck with the foldable caster unit according to claim 1, wherein the rear linkage mechanism comprises a rear driving pipe, a rear supporting arm and a rear fixing base, and the rear driving pipe is rotatably connected with the connecting rod, one end of the rear supporting arm is connected and fixed with the rear driving pipe, another end of the rear supporting arm is pivotally connected with the rear fixing base, the rear fixing base is connected and fixed with the load-bearing plate, and the rear driving pipe is arranged such that the end of the rear driving pipe is capable of abutting against an inner surface of the rear caster unit so as to drive the rear caster unit to rotate and unfold to the unfolded rolling position during the rotation of the operating handle from the first position to the second position.

4. The flatbed with the foldable caster unit according to claim 3, wherein the operating handle is provided on a lower surface of the load-bearing plate, the operating handle is provided with a lug, and the lug is connected with a sliding sleeve, the sliding sleeve is sleeved on the connecting rod and is capable of sliding along the connecting rod, a front end and a rear end of the connecting rod are respectively rotatably connected with the front driving pipe and the rear driving pipe, the lug is arranged to be able to drive the connecting rod away from or close to the load-bearing plate when the operating handle is rotated between the first position and the second position.

5. The flatbed with the foldable caster unit according to claim 4, wherein the operating handle comprises a U-shaped handle body, and the handle body comprises two side arms forming an integrated structure, and a grip that is provided between the two side arms and connects one end of each side arm, a rotating shaft and a positioning shaft are further provided between the two side arms, and the rotating shaft is provided at one end of each side arm opposite to the grip, two mounting platforms for placing the rotating shaft are symmetrically provided at a position on the lower surface of the load-bearing plate corresponding to the rotating shaft, a semi-circular arc groove is provided on a top surface of the mounting platform, the rotating shaft is placed in the semi-circular arc groove and is then covered and fixed by a pressing plate provided with a semi-circular arc groove, and the lower surface of the load-bearing plate is provided with two sets of positioning clips, and the two sets of positioning clips are symmetrically fixed at a position on the lower surface of the load-bearing plate corresponding to the positioning shaft with the rotating shaft as the axis of symmetry, the rotating shaft is capable of being respectively clamped into the two sets of positioning clips to fix the operating handle when the operating handle is located at the first position and the second position.

6. The flatbed with the foldable caster unit according to claim 3, wherein the operating handle is provided on an upper surface of the load-bearing plate, and the operating handle is respectively provided with a first connecting shaft and a second connecting shaft on both sides of the pivot axis of the operating handle, the connecting rod comprises a front connecting rod and a rear connecting rod, the front connecting rod and the rear connecting rod are staggered arranged in the axial direction of the pivot axis of the operating handle, one end of the front connecting rod is rotatably connected to the front driving pipe, another end of the front connecting rod is rotatably connected to the first connecting shaft, one end of the rear connecting rod is rotatably connected to the rear driving pipe, and another end of the rear connecting rod is rotatably connected to the second connecting shaft.

7. The flatbed with the foldable caster unit according to claim 6, wherein the operating handle comprises a U-shaped handle body, and the handle body comprises two side arms forming an integrated structure and a grip that is provided between the two side arms and connects one end of each side arm, the operating handle is symmetrically provided with cylindrical protruding pillars on inner sides of the two side arms, the cylindrical protruding pillars are rotatably connected with the load-bearing plate, and outer sides of the side arms are respectively provided with the first connecting shaft and the second connecting shaft on both sides of the cylindrical protruding pillars, the connecting rods comprises a front connecting rod and a rear connecting rod, and the front connecting rod and the rear connecting rod are staggered arranged in the axial direction of the pivot axis of the operating handle, a front end and a rear end of the front connecting rod are both provided with circular holes, the front end of the front connecting rod is sleeved on the front driving pipe and is rotatably connected with the front driving pipe, the rear end of the front connecting rod is sleeved on the first connecting shaft and is connected with the first connecting shaft, a front end and a rear end of the rear connecting rod are provided with circular holes, the rear end of the rear connecting rod is sleeved on the rear driving pipe and is rotatably connected with the rear driving pipe, the front end of the rear connecting rod is sleeved on the second connecting shaft and is rotatably connected with the second connecting shaft.

8. The flatbed with the foldable caster unit according to claim 4, wherein ends of the front driving pipe and the rear driving pipe are provided with lock plugs, and the lock plugs are provided with clamping slots, the front caster unit and the rear caster unit are provided with clamping pillars at a position corresponding to the clamping slots, and the clamping pillars are arranged to be inserted into the clamping slots when the front caster unit and the rear caster unit are rotated to the unfolded rolling position.

9. The flatbed with the foldable caster unit according to claim 8, wherein the caster unit comprises a fixing sleeve, a rotating block, a caster frame and a caster, a lower part of the fixing sleeve is provided with a notch, the rotating block is placed in the notch, the fixing sleeve and the rotating block are both sleeved on the load-bearing support frame, and the fixing sleeve is connected and fixed with the load-bearing plate, the caster frame is connected and fixed with the rotating block, and the caster is rotatably mounted on the caster frame, the reset device is torsion spring, the torsion spring is sleeved on the load-bearing support frame, and both ends of the torsion spring respectively abut against the fixing sleeve and the rotating block, so as to provide a force for a rotation of the rotating block relative to the fixing sleeve, the clamping pillar is arranged on an inner side of the rotating block.

10. The flatbed with the foldable caster unit according to claim 5, wherein ends of the front driving pipe and the rear driving pipe are provided with lock plugs, and the lock plugs are provided with clamping slots, the front caster unit and the rear caster unit are provided with clamping pillars at a position corresponding to the clamping slots, and the clamping pillars are arranged to be inserted into the clamping slots when the front caster unit and the rear caster unit are rotated to the unfolded rolling position.

11. The flatbed with the foldable caster unit according to claim 6, wherein ends of the front driving pipe and the rear driving pipe are provided with lock plugs, and the lock plugs are provided with clamping slots, the front caster unit and the rear caster unit are provided with clamping pillars at a position corresponding to the clamping slots, and the clamping pillars are arranged to be inserted into the clamping slots when the front caster unit and the rear caster unit are rotated to the unfolded rolling position.

12. The flatbed with the foldable caster unit according to claim 7, wherein ends of the front driving pipe and the rear driving pipe are provided with lock plugs, and the lock plugs are provided with clamping slots, the front caster unit and the rear caster unit are provided with clamping pillars at a position corresponding to the clamping slots, and the clamping pillars are arranged to be inserted into the clamping slots when the front caster unit and the rear caster unit are rotated to the unfolded rolling position.

\* \* \* \* \*